P. HELDMANN.
BELT SEWING MACHINE.
APPLICATION FILED SEPT. 22, 1910.

1,015,438.

Patented Jan. 23, 1912.
6 SHEETS—SHEET 3.

WITNESSES:
Charles Junge
Wilhelm Berg

INVENTOR:
Peter Heldmann

UNITED STATES PATENT OFFICE.

PETER HELDMANN, OF FRANKFORT-ON-THE-MAIN, GERMANY, ASSIGNOR TO THE CORPORATION OF MASCHINENFABRIK MOENUS A. G., OF FRANKFORT-ON-THE-MAIN, GERMANY.

BELT-SEWING MACHINE.

1,015,438.  Specification of Letters Patent.  Patented Jan. 23, 1912.

Application filed September 22, 1910. Serial No. 583,202.

*To all whom it may concern:*

Be it known that I, PETER HELDMANN, a subject of the Grand Duke of Hesse-Nassau, residing at 92 Moltke Alle, Frankfort-on-the-Main, in the Kingdom of Prussia and Empire of Germany, have invented certain new and useful Improvements in Belt-Sewing Machines, of which the following is a specification, reference being had therein to the accompanying drawings.

This invention relates to belt-sewing machines designed for producing a zig-zag seam by means of a two pointed needle, and has for its object to increase the efficiency of these machines, as regards both the quantity and quality of the work, by means of improvements which enable the machines to perform automatically the operations which heretofore were effected or assisted by an attendant.

The improvements consist substantially in the arrangement of automatically acting devices, through which, irrespective of the varying thickness of the work, a uniform and short stitch crown is always obtained, which is especially of importance on the driving side of belt, to protect the seam against wear; for the same purpose other devices are provided which protect the leather laces from accidental damage during the sewing, and allow of the seam being tightened and the leather lace being drawn into the surface of the belt, without diminishing the rapidity of the sewing.

A constructional form of the invention is illustrated in the accompanying drawings, which form part of this specification.

Figures 1, 2, 3, 4, 5:
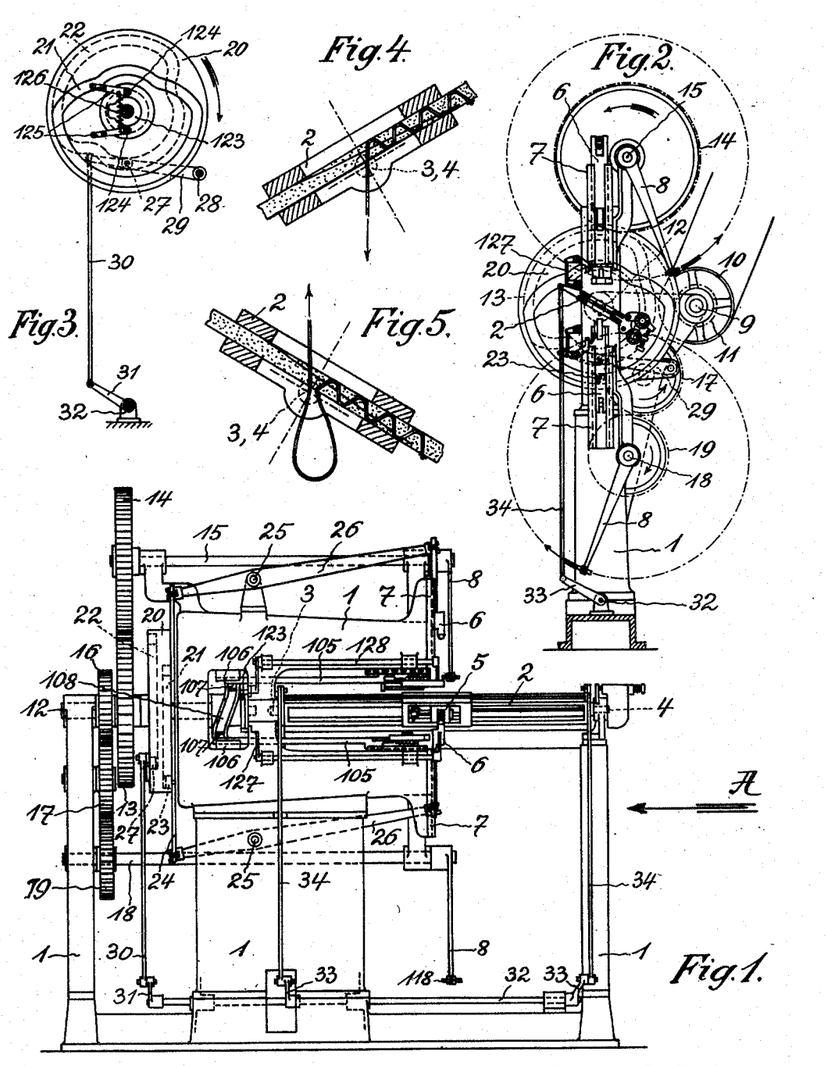
Figure 1 shows a side elevation of the machine.
Fig. 2 is a front elevation of the same as seen in the direction of the arrow A.
Fig. 3 shows a front elevation of the devices for tilting the table.
Figs. 4 and 5 are views of the work table shown diagrammatically in its two slanting positions and Fig. 6 is a side view of the table partly in section.

In the machine frame 1 (Figs. 1 and 2) the tiltable work table 2 is mounted by the pivots 3 and 4. Crosswise to its longitudinal axis is provided the needle track, on which the needle holders 6, which alternately take up the two pointed needle 5 and are adapted to slide to and fro in guides 7. In the constructional form shown in the drawings, the needle holders 6 move up and down above and below the table 2. Levers 8 are provided for the tightening of the leather laces. The table, the needle holders, the tightening levers and all the other devices hereinafter described are actuated from the main driving mechanism of the machine. The shaft 9 of the driving pulley 10 carries a gear wheel 11, which engages the gear wheel 13 keyed to the main shaft 12 and turns this shaft in the direction of the arrow. By means of the gear wheels 13 and 14 the shaft 15 with the upper tightening lever 8 is actuated, whereas the lower tightening lever 8 receives its rotary movement through the gear wheel 16, also keyed to the main shaft 12, the intermediate gear wheel 17 and through a gear wheel 19 keyed to the shaft 18. The main shaft 12 carries furthermore a cam disk 20 provided with two cam slots 21 and 22. In the slot 21 the guide roller 23 of the bar 24 is guided, the ends of which are movably connected with the levers 26 which can swing around the bolts 25. The oscillating levers 26 actuated by the rotation of the cam, impart up and down motion to the needle holders 6. Through the cam slot 22 a lever 29, pivotally mounted at 28 on the frame and provided with a roller 27 receives its motion (see Fig. 3), which by means of the rod 30, an arm 31, the shaft 32, another arm 33 and the rods 34 is transmitted to the table 2 and causes the tilting of the same from one slanting position to the other (Figs. 1 and 2). The two slanting positions of the table 2 are indicated in the diagrammatic views Figs. 4 and 5.

Figure 7:
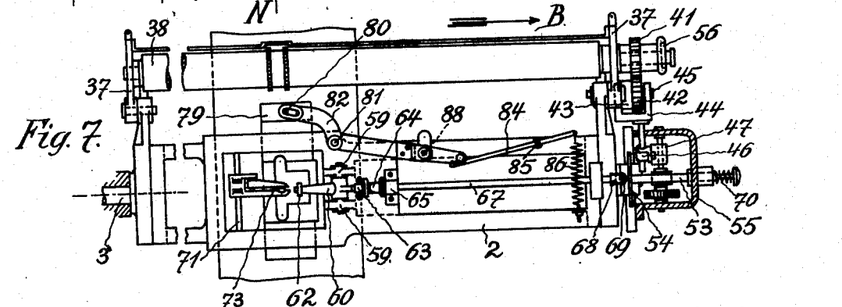
Figs. 7 and 8 are respectively a plan and front view of the same.
Figures 8, 9, 10:
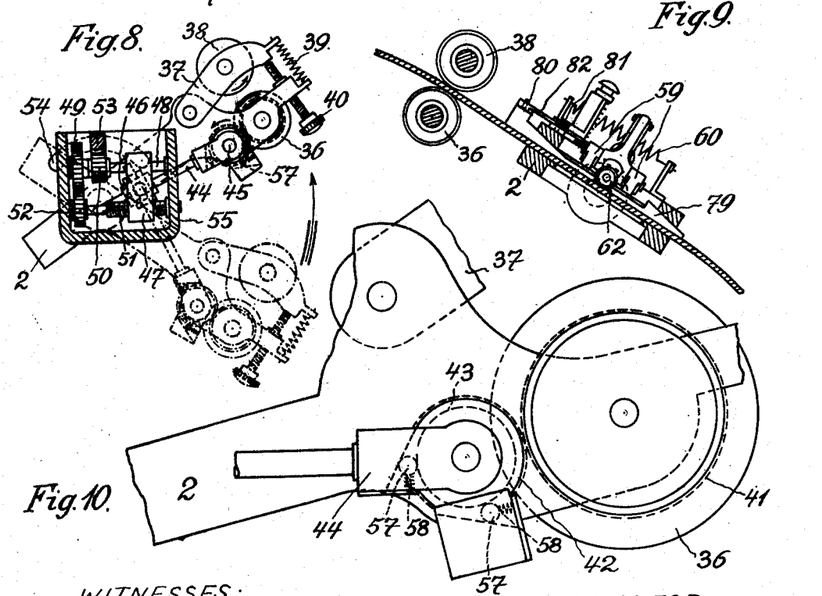
Fig. 9 is a cross section of the table as seen when looking in the direction of the arrow B, Fig. 7.
Fig. 10 is an enlarged view of details shown in Fig. 8.

The table is formed of a frame provided with a slot 35; in the end parts of the former the feed roller 36 rests. Against this latter a roller 38 held in swing levers 37 is pressed by springs 39 (Fig. 8) to keep the work between the two rollers in contact with the feed roller 36 and to guide it during the feed. The necessary space between the two rollers is maintained by the adjusting screws 40 provided at each end. Fastened to the shaft of the feed roller 36 is a gear wheel 41 which engages a gear wheel 42. The gear wheel 42 is connected with a collar 43 and rests with the same in the forked lever 44, pivoted at 45 to one side of the table 2 (Figs. 7, 8 and 10). The forked lever 44 protrudes into a bearing 46 pivotally fastened to the slide 47 adapted to be displaced sidewise. The slide 47 is guided by a shaft 48, carrying the gear wheels 49, 50, of which the former 49 engages a gear wheel 52 on a spindle 51. The spindle 51 is threaded and extends through the slide 47. The gear wheel 50 of the shaft 48 engages a rack 53 which has on its end a segment-like pressure-piece 54. The shaft 48, the spindle 51 and the rack 53 are housed in a casing 55 provided on the stand 1. These devices of work table 2 serve as means for feeding the work forward and to adjust the amount of the feed.

If the table tilts from the position indicated in dotted lines in Fig. 8 to the other slanting position, the forked lever 44 holding the gear wheel 42 with the collar 43 takes part in such tilting movement, being fastened by its bolt 45 to the table 2. During this movement one end of the forked lever 44 can slide freely in the rotatable bearing 46. At the same time the gear wheel 42 receives a rotary motion and transmits the same to the gear wheel 41 and to the feed roller 36 through which the work is moved forward a certain normal distance (stitch length), this taking place according to the invention only after every second stitch. This is only necessary on account of work table 2 being mounted eccentrically. Its pivot is, as Fig. 4 shows, below the middle of the table, a little below the under surface of the work, so that after a stitch from above has been effected the stitch on the underside moves a short distance sidewise from the vertical needle track during the tilting of the table to its other slanting position (Fig. 5), thereby determining at the same time the penetrating point for the penetration from below. Only before the next penetration directed downward, the feed of the work has again to take place.

The gear wheel 42 which rests in the forked lever 44 and effects the rotation of the feed roller 36, is prevented from turning backward by check devices. The check devices, one of which is provided on the forked lever 44 and the other on the side of the table 2 consist of rollers 57 which by means of springs 58 are pressed against the collar 43 connected with the gear wheel 42. The gear wheel 41 is mounted upon a sleeve 56 slidably fastened by key and keyway to the shaft of the feed roller 36, thereby enabling the gear wheel 41 to be moved away from the gear wheel 42.

Figure 6:
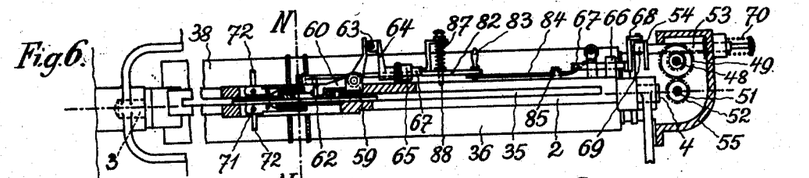
Figures 11, 12, 14, 15, 16, 17:
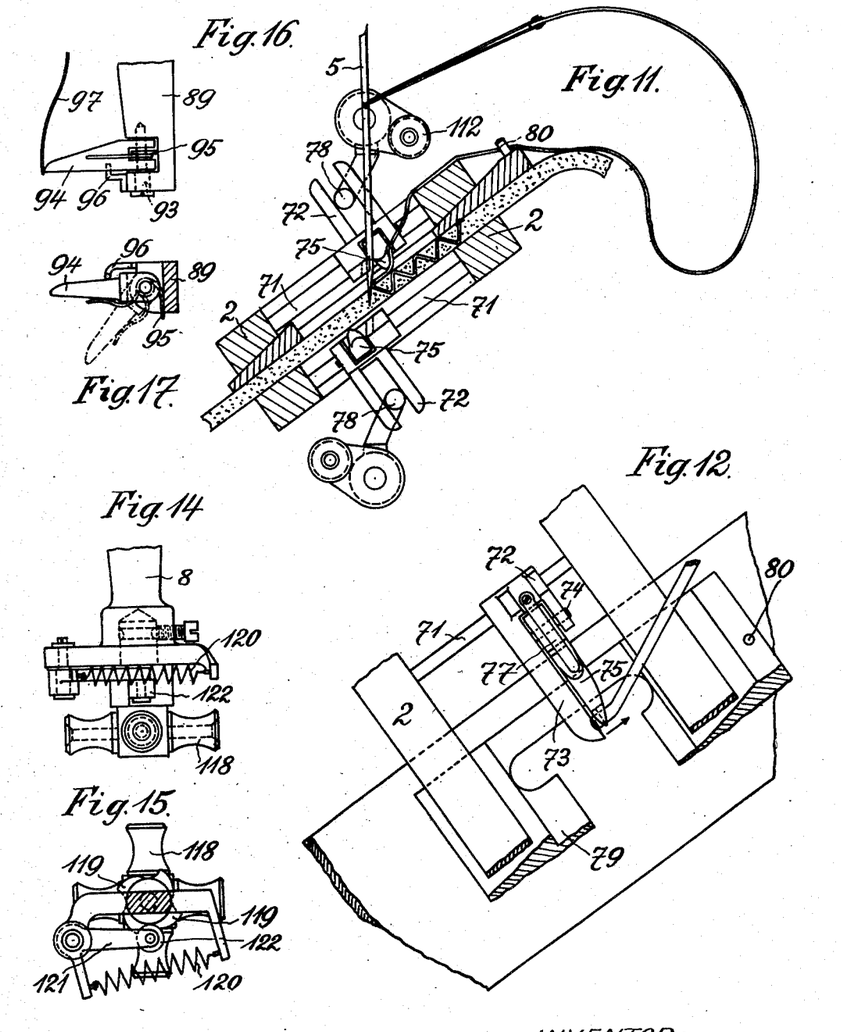
Fig. 11 is a sectional view of the table, needle and lace pressing devices.
Fig. 12 is an enlarged view of one of the lace pressing devices.
Figs. 14 to 22 show different devices and their assemblage regarding each other in their relative working positions.

The automatic determination of the stitch point to secure short and uniform stitch crown is attained through the following devices. On the table 2, in bearings 59 a bell-crank lever 60 is pivotally mounted, one arm of which is provided with a roller 62 which touches the upper surface of the work (the belt to be sewed) running through the table, in the closest proximity to the vertical needle track indicated by the lines N—N in Fig. 6. The other arm of the bell-crank lever 60 bears against an arm 64 which is provided with a roller 63 and which forms one end of the rod 67 mounted in bearings 65 and 66. The other end of the rod 67 has also an arm 68 which carries a roller 69. This roller bears against the segment-shaped pressure piece 54 of the rack 53. The contact of both parts 54, 69 is maintained by a spring 70. While introducing and conducting the work the feeler roller 62 comes in contact with its surface. According to the varying thickness of the work the roller changing its position in the vertical direction causes the bell-crank lever 60 to turn correspondingly. Thus a lateral displacement of the rod 67 and of the rack 53 against the action of the spring 70 takes place and by means of the gear wheel 50 acting together with the rack 53, and also the gear wheels 49, 52 and the screw threaded spindle 51, the slide 47 is displaced sidewise, thereby shifting the fulcrum (bearing 46) of the forked lever 44. This shifting of the fulcrum causes the amount of the feed of the work due to the tilting of the work table 2 to be lengthened or shortened. The amount of the feed is therefore automatically adjusted to a corresponding extent, so that notwithstanding the variation in the thickness of the work the stitch point is determined regularly. To aid this device, which is of great importance for a regular sewing, another device acting in conjunction with the former is provided which keeps the determined stitch point free, thereby enabling the stitch to be made quite close to the previous stitch. This device is constructed as follows: A guide rod 71 is provided above and below the work in the frame of the table 2 (Figs. 6, 7, 11, 12, 13, and 19), and on this guide is a slide carrying a fork 72 and arm 73, and furthermore a presser foot 75 adapted to turn on the bolt 74. The presser foot has the form especially shown in Fig. 13; its front edge terminates hook like in a narrow rounded edge 76 whereby the presser foot, through the action of a spring 77, is pressed against the work at the seam. Bolts 78 fastened to the machine frame 1 engage the fork 72 of the slides, so that in the tilting of the work table 2 from one slanting position to the other a lateral motion is imparted to the two slides on their guide rods 71. If now for example (Fig. 13) the leather lace is drawn from below through the work and the table, to prepare for a new stitch, tilts to another slanting position, the presser foot 75 will by its lower edge 76 bear against the leather lace, turn sidewise away from the needle track and push the leather lace lying below along with it. In this manner the stitch point is exposed and the stitch can be effected in immediate proximity to the last stitch (Figs. 11 and 12): The presser foot 75 has a rounded surface at its front end in order that, until the pull through the work is almost completed, the leather lace, which with a fresh stitch finally terminates in a small loop (indicated in the dotted lines Fig. 13) can easily slide off and be drawn tight. The same operation is repeated alternately above and below the work table.

The arm 73 of each of the slides provided on the guide rod 71 serves to guide the needle 5 immediately above the work so that the needle will not slide accidentally from the stitch point or break.

To secure the work in its adjusted position against accidental displacement, which may happen in consequence of the push exerted by the needle upon the slanting work, use is made of an automatic holding device constructed as follows. In the table frame a slide 79 is arranged which bears with two wedge-shaped faces on the table frame 2, and which rest with its lower surface on the upper surface of the work (Figs. 6, 7, 9, 11 and 12). The slide 79 acts by the bolt 80 upon one end of a lever 82 which has its fulcrum at 81 and the other end of which is connected by means of the bolt 83 to another lever 84. Lever 84 has its fulcrum at 85 and is pressed against the lever 82 by the spring 86, thus causing at the same time the inward movement of the slide 79 in an opposite direction to that of the feed. This movement of the slide 79, owing to the action of the wedge shaped face, causes the same to be pressed upon the work so as to secure its positions in the table. The automatic feed of the work is not hindered by this arrangement, as at this time the wedge shaped faces of the slide 79 and the frame 2 separate, so that the slide 79 releases the work. If desired the action of the slide 79 may also be suppressed if the lever 82 is turned by hand against the action of the spring actuated lever 84, thus withdrawing the slide from the frame 2. The position of rest of the lever 82 is maintained by the catch-bolt 88 provided thereon, this bolt being actuated by a spring 87 and adapted to enter the table frame, the latter being provided with an opening for the reception thereof so disposed as to hold the said lever in its position of rest.

The new machine has further contrivances which contribute toward the production of a uniform seam. First there are the devices acting in such a manner as to feed the leather lace properly and also to obviate damage to the same during the sewing, the leather lace being diverted automatically from the needle track during the upward movement of the needle, and being held so as to exclude all liability to damage.

Each needle-holder-guide 7 is provided with a bell-crank lever 89 (Figs. 16, 17, 18, 19, 21 and 22) which is held in a normal position determined by a stop pin 92, by means of a spring 91 and carrying on its short arm a roller 90. The long arm of the bell-crank lever 89 has at its end a finger 94 adapted to turn on the bolt 93, the said finger being pressed against the stop 96 through the spiral spring 95, while a resilient locking catch 97 bears against the point of the finger 94. Each needle holder 6 has on its side a curved projection 98 which comes in contact with the roller 90 during the to and fro motion of the needle holder and causes the bell crank lever 89 to swing.

Figures 13, 18:
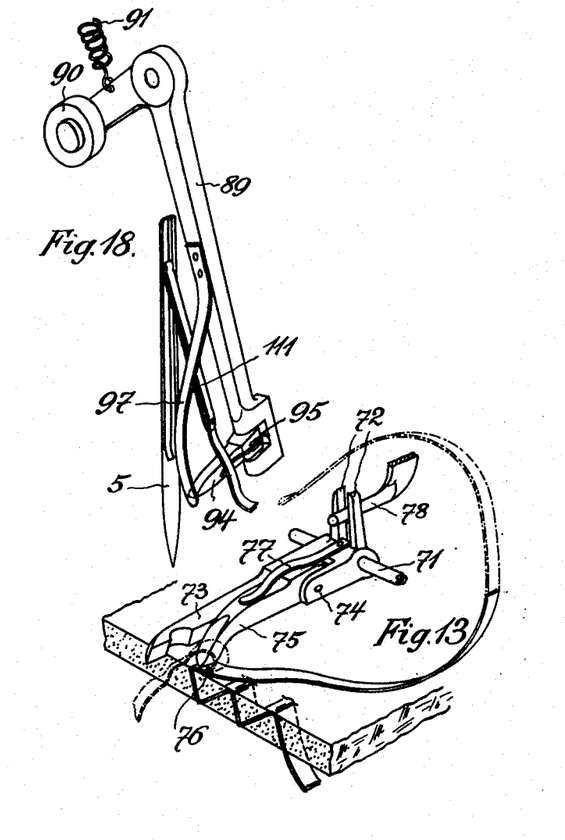
Fig. 13 is a view in perspective of one of the lace pressing devices.
Figures 19, 19A, 20:
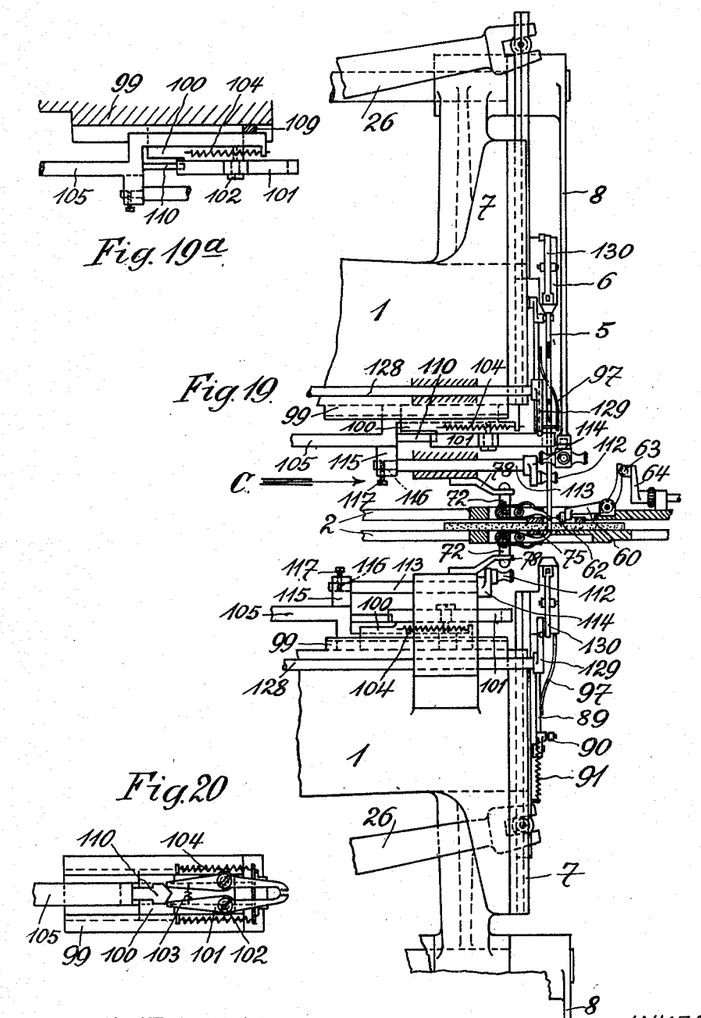

The normal position of the bell crank lever 89 is the one in which, when crossing the needle track its end provided with the resilient finger 94 is turned toward the opposite needle side and incloses the leather lace between the parts 94 and 97. As soon as the needle holder 6, carrying the needle 5 (for example the upper holder in Fig. 21) begins its movement for the stitch the lever 89 swings sidewise (in the drawing to the right as indicated in dotted lines), and in the further motion of the needle holder pulls the leather lace together with the needle tongue 111 sidewise. This prevents the entanglement of the leather lace and the accidental entrance of the same into the needle track, whereby the lace might be damaged. Moreover the needle tongue is caused to pass to its position preparatory to the new stitch thus insuring a regular insertion of the leather lace into the work. When the other needle holder 6 (in the drawings Figs. 21 and 22 the lower holder) takes up the needle (Fig. 22) and pulls the leather lace through to the other side, the lace can easily be released by the resilient finger 94 on the bell-crank lever 89, as it slides down the slanting surface of the same and overcoming the power of the spring 97, leaves the finger 94. At every return movement of the bell-crank lever 89 to its normal position when the lever impinges against the leather lace the finger 94 gives way in order to combine again with the spring 97 after having taken up the leather lace so that the lace is inclosed by the two parts 94 and 97, as shown in Fig. 18.

Figures 21, 22:
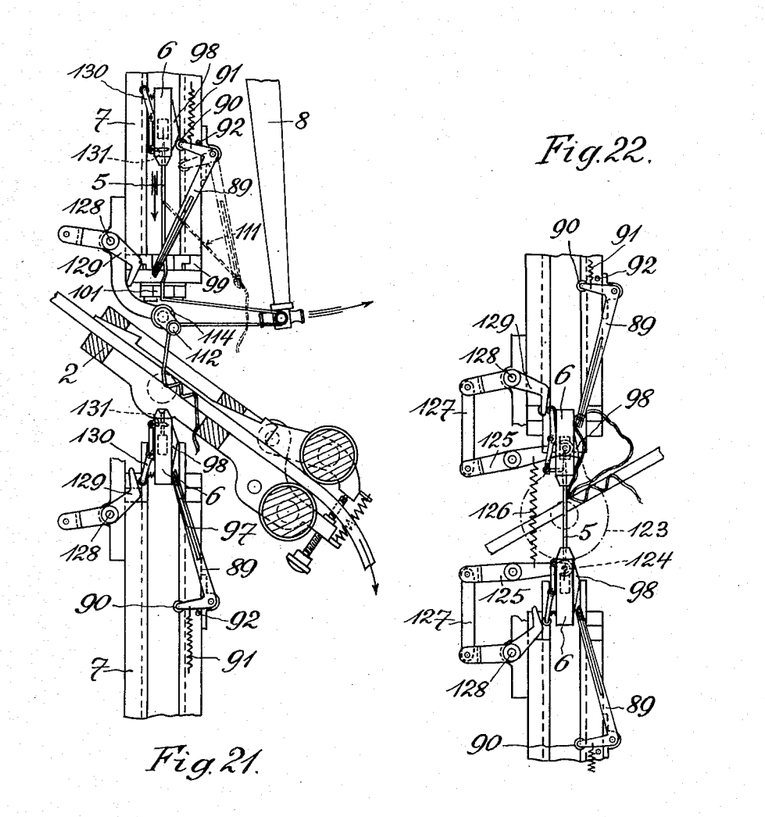

Furthermore use is made of the following arrangement. Above and below the work table 2 guides 99 are mounted on the machine frame 1; in each of these guides is a slide 100 carrying a pair of pincers 101, the jaws of which turn on bolts 102 and which are kept open by means of the spring 103. Two springs 104 connect each slide 100 with a rod 105 (Fig. 1) which engages the cam disk 108 by means of a roller 107 provided at its end guided in the block 106. The cam disk 108 is secured to the main shaft 12 and in its rotation imparts alternate to-and-fro movement to the two rods 105, thus actuating each of the pincers 101. In the forward movement of rod 105 with the slide 100 in the direction of the arrow C, this slide pushes against the catch 109 (Fig. 19ª) and stops, while the rod, overcoming the power of the springs 104, continues its motion and pushes its wedge shaped projection 110 between the jaws 101, thereby opening the latter for a moment so that they will take hold of the lace exactly at the point where it is connected with the needle tongue 111 (Fig. 21). At this moment the tightening lever 8 can tighten the leather lace in the work without such lace being torn from the needle, or being liable to damage. During the tightening of the leather lace, on its way between the work, and the tightening lever 8, it is furthermore guided by the roller 112 which is fastened by means of a small lever 114 to a bolt 113 combined with the slidable rod 105. The roller 112 is mounted in such a way that the tightening of the leather lace takes place as near as practicable in the line of the stitch. The bolt 113 is provided on its end, which enters the boss 115, with a groove 116 which is engaged by an adjusting screw 117. Thereby enabling the bolt 113 and consequently the position of the guide roller 112 to be adjusted.

At the end of the tightening lever 8 a body is pivotally mounted provided with 4 rollers 118 (Figs. 14 and 15) and with ratchet teeth 119, this body being held in a certain position by means of the lever 121 subjected to the action of the spring 120 and provided with the check roller 122.
One or the other of the rollers 118 acts as a carrier during the tightening of the leather lace and changes its position on a certain tension of the leather lace being reached as the roller carrier completes a revolution and another roller 118 takes place of the former. Meanwhile the leather lace has left the tightening lever and can be introduced at the new stitch point without any obstacle.
To secure the alternate passage of the needle 5 from one needle holder 6 to the other, provision is made, in the constructional form of the machine shown, of a cam disk 123 arranged on the main shaft 12 (Figs. 1, 3 and 22) and provided with a cam surface against the periphery of which two levers 125 furnished with rollers 124 are pressed by means of the spring 126. With the extreme end of each of these levers 125 engages an arm 127 of the shaft 128 mounted on the machine frame 1. The shaft 128 extends to the guide 7 and has a lever 129 which protrudes into the path of the resilient check lever 130 which is borne laterally on the needle holder 6. When one needle holder 6 has reached the position where the needle has been given to the other needle holder 6, the lever 129 moves the check lever 130 of the first named lever and the holding nose 131 releases the needle 5 (Fig. 22, upper needle holder).

In short, the operation of the machine is as follows: The lower needle holder with the needle and the leather lace attached to the latter ascends, executes the first stitch at the point previously exposed and gives the needle to the upper needle holder. As soon as the latter has reached its uppermost position the leather lace is caught by the holding device (the pincers 101). At the same moment the tightening lever 8 begins to pull the leather lace tight in the work. While the stitching and tightening of the lace is still in progress, the tilting of the work table commences and shortly afterward the upper needle holder 6 commences its return or downward movement. The holding device (pincers 101) has in the meantime released the leather lace. During the downward movement of the needle holder the diverting device (lever 89 etc.) comes into action and prepares the needle tongue with the leather laces for a new stitch, which occurs immediately after the tilting of the table which has already taken place. At the moment when both needle holders meet, the needle fastens itself again in the lower needle holder and the operation is repeated.

Having thus described my invention, the following is what I claim as new therein and desire to secure by Letters Patent:

1. In a device for sewing belts with leather laces, a table, feeding means automatically actuated by said table, automatic devices embodying a resiliently controlled presser foot and a slide having a wedge-shaped face for pressing down the work to secure it in position on the table.

2. In a machine for sewing belts with leather laces, a tilting work table, a needle, feeding means automatically actuated by the tilting of said table, a resilient presser foot, means for automatically operating the same, wedging means for pressing down the work to secure it in position on the table, and means embodying a resilient finger for diverting the lace during the upward movement of the needle.

3. In a machine for sewing belts with leather laces, a tilting work table, a needle, feeding means automatically actuated by the tilting of said table, wedging means for pressing down the work to secure it in position on the table, a resilient presser foot, means for automatically operating the same, and means embodying a resilient finger for diverting the lace during the upward movement of the needle, said resilient presser foot constructed to push the lace after each stitch to hold it.

4. In a machine for sewing belts with leather laces, a needle, automatic devices embodying a resilient presser foot for pushing the lace after each stitch and holding it, means embodying a resilient finger for diverging the lace during the upward movement of the needle, a tilting work-table, means automatically actuated by said table to feed the work, and means for tightening the lace.

5. In a machine for sewing belts with leather laces, a tiltably mounted work-table, means automatically actuated by said table for feeding the work, a slide having a wedge-shaped face for pressing down the work and a resilient presser foot constructed to push the lace after each stitch and to hold it.

6. In a machine for sewing belts with leather laces, a tiltably mounted work-table, means automatically actuated by said table for feeding the work, a slide having a wedge-shaped face for pressing down the work, a resilient presser foot constructed to push the lace after each stitch and to hold it, and for freeing the stitch point after each stitch.

7. In a machine for sewing belts with leather laces, a tiltably mounted work-table, means automatically actuated by said table for feeding the work, a slide having a wedge-shaped face for pressing down the work, a resilient presser foot constructed to push the lace after each stitch and to hold it and for freeing the stitch point after each stitch, and means constructed to support the needle immediately above the work to prevent the needle from sliding accidentally from the stitch point.

8. In a machine for sewing belts with leather laces, a work table mounted to tilt, means automatically actuated by said table to feed the work, a resilient presser foot for pushing the lace after each stitch and holding it, and a needle guide connected to said presser foot.

9. In a machine for sewing belts with leather laces, a work table mounted to tilt, means automatically actuated by said table to feed the work, a resilient presser foot, for pushing the lace after each stitch and holding it, and a needle guide connected to said presser foot constructed to guide the needle before each stitch.

10. In a machine for sewing belts with leather laces, a work table mounted to tilt, means automatically actuated by said table to feed the work, a resilient presser foot for pushing the lace after each stitch and holding it, and a needle guide connected to said presser foot constructed to guide the needle before each stitch, immediately above the stitch point.

11. In a machine for sewing belts with leather laces, a tilting work table, feeding means automatically actuated by said table and a wedge clamp member constructed to act automatically after each feed of the work, a lace diverting device and a needle holder for actuating the same.

12. In a machine for sewing belts with leather laces, a tilting table, feeding means automatically actuated by said table and a lace diverting device and a needle holder actuating the same.

13. In a machine for sewing belts with leather laces, a tilting table and a lace diverting device, and a needle holder for actuating the same.

14. In a machine for sewing belts with leather laces, a tilting table, a lace diverting device, a needle holder for actuating the same, and a locking catch for coöperation with the lace diverting device.

15. In a machine for sewing belts with leather laces, a tilting table, a needle tongue, a gripping device for catching the lace and relieving said tongue of strain, and a slide movable crosswise to the path of the needle for coöperation with the gripping device.

16. In a machine for sewing belts with leather laces, a tilting table, a needle tongue, a gripping device for catching the lace and relieving said tongue of strain, a slide movable crosswise to the path of the needle for coöperation with the gripping device, and a slide to which said gripping device is secured.

17. In a machine for sewing belts with leather laces, a tilting table, a needle tongue, a gripping device for catching the lace and relieving said tongue of strain, a slide movable crosswise to the path of the needle for coöperation with the gripping device, a slide to which said gripping device is secured, and means for tightening the stitch adjacent to the line of perforation.

18. In a machine for sewing belts with leather laces, a tilting work-table, and a gear wheel thereon rotatable in one direction only, and feeding means operatively connected with said gear wheel.

19. In a machine for sewing belts with leather laces, a tiltable work table, a gear wheel thereon rotatable in one direction only, a feeding device operatively connected with said gear wheel and a lever swinging with said table.

20. In a machine for sewing belts with leather laces, a tiltable work table, a gear wheel thereon rotatable in one direction only, a lever swinging with said table, a driving roller and a gear wheel for revolving said roller.

21. In a machine for sewing belts with leather laces, a tiltable work table, a gear wheel thereon, rotatable in one direction only, a lever swinging with said table, a driving roller, a gear wheel for revolving said roller, a spindle and a slide movable thereon and in which said lever is fulcrumed.

22. In a machine for sewing belts with leather laces, a tiltable work-table, means automatically actuated by said table to feed the work, levers for tightening the lace, mounted to swing in one direction only, a lace diverging device, a needle holder for actuating the same and means for automatically tilting the work-table.

In testimony whereof I affix my signature in the presence of two witnesses.

PETER HELDMANN.

Witnesses:
JEAN GRUND,
CARL GRUND.